(12) United States Patent
Lee et al.

(10) Patent No.: US 11,555,132 B2
(45) Date of Patent: Jan. 17, 2023

(54) NEAR-INFRARED ABSORBING COMPOSITION, OPTICAL STRUCTURE, AND CAMERA MODULE AND ELECTRONIC DEVICE COMPRISING THE SAME

(71) Applicant: Samsung Electronics Co., Ltd., Suwon-si (KR)

(72) Inventors: Yong Joo Lee, Suwon-si (KR); Mi Jeong Kim, Hwaseong-si (KR); Changki Kim, Suwon-si (KR); Hyung Jun Kim, Suwon-si (KR); Hye Ran Kim, Hwaseong-si (KR); Jong Hoon Won, Yongin-si (KR); Jae Jun Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 542 days.

(21) Appl. No.: 16/692,199

(22) Filed: Nov. 22, 2019

(65) Prior Publication Data

US 2020/0248028 A1 Aug. 6, 2020

(30) Foreign Application Priority Data

Feb. 1, 2019 (KR) ........................ 10-2019-0013914

(51) Int. Cl.
| | |
|---|---|
| *C09D 143/02* | (2006.01) |
| *C07F 9/09* | (2006.01) |
| *C08F 230/04* | (2006.01) |
| *C09D 5/32* | (2006.01) |
| *H04N 5/225* | (2006.01) |

(52) U.S. Cl.
CPC ............ *C09D 143/02* (2013.01); *C07F 9/095* (2013.01); *C07F 9/098* (2013.01); *C08F 230/04* (2013.01); *C09D 5/32* (2013.01); *H04N 5/2254* (2013.01)

(58) Field of Classification Search
CPC ......... C09D 143/02; C09D 5/32; C07F 9/095; C07F 9/098; C08F 230/04; H04N 5/2254
USPC .................................................. 106/287.29
See application file for complete search history.

(56) References Cited

U.S. PATENT DOCUMENTS

| | | |
|---|---|---|
| 9,465,142 B2 | 10/2016 | Muro et al. |
| 9,618,666 B2 | 4/2017 | Kawashima et al. |
| 10,036,838 B2 | 7/2018 | Bak et al. |
| 2004/0191485 A1 | 9/2004 | Groothues et al. |
| 2015/0293283 A1 | 10/2015 | Nara et al. |
| 2018/0188428 A1 | 7/2018 | Arimura et al. |

FOREIGN PATENT DOCUMENTS

| | | |
|---|---|---|
| EP | 00343568 A1 | 11/1989 |
| JP | 06287194 A | 10/1994 |
| JP | 2004536733 A | 12/2004 |
| JP | 2008303308 A | 12/2008 |
| JP | 2014074769 A | 4/2014 |
| JP | 2014197170 A | 10/2014 |
| JP | 2014214296 A | 11/2014 |
| JP | 2015034837 A | 2/2015 |
| JP | 2017142502 A | 8/2017 |
| KR | 20040022721 A | 3/2004 |
| KR | 20150036298 A | 4/2015 |
| KR | 20150097761 A | 8/2015 |
| KR | 101723118 B1 | 4/2017 |
| WO | WO-16002701 A1 | 1/2016 |
| WO | WO-17056803 A1 | 4/2017 |

*Primary Examiner* — Kristin A Vajda
(74) *Attorney, Agent, or Firm* — Harness, Dickey & Pierce, P.L.C.

(57) ABSTRACT

Disclosed are a near-infrared absorbing composition, an optical structure, and a camera module and an electronic device including the same. The near-infrared absorbing composition includes a copper complex represented by Chemical Formula 1.

[Chemical Formula 1]

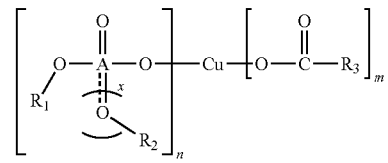

Definitions of Chemical Formula 1 are the same as described in the detailed description.

20 Claims, 16 Drawing Sheets

NEAR-INFRARED ABSORBING COMPOSITION, OPTICAL STRUCTURE, AND CAMERA MODULE AND ELECTRONIC DEVICE COMPRISING THE SAME

CROSS-REFERENCE TO RELATED APPLICATION

This application claims priority to and the benefit of Korean Patent Application No. 10-2019-0013914, filed in the Korean Intellectual Property Office on Feb. 1, 2019, the entire contents of which are incorporated herein by reference.

BACKGROUND

1. Field

A near-infrared absorbing composition, an optical structure, and a camera module and an electronic device including the same are disclosed.

2. Description of the Related Art

Recently, electronic devices including image sensors that store images as electrical signals, such as cell phones, digital cameras, camcorders, and cameras, have become ubiquitous.

These electronic devices may include an optical filter having a near-infrared absorptivity in order to reduce or prevent generation of an optical distortion by light in the other regions than a visible region.

The optical filter is generally mounted in front of an image sensor of a camera module and thus plays a role of effectively absorbing an incident near-infrared ray and resolving the optical distortion phenomenon.

Recently, many attempts to make the optical filter into a thin film have been made to all for down-sizing and integration with electronic devices. However, when the thin-film optical filter is used to observe and take a picture of a high luminance subject, it may cause a flare phenomenon such as a wifi-type flare phenomenon with an outline around the subject, a petal flare phenomenon withy light radiated from the subject, and similar visual distortions.

These flare phenomena are optical distortion phenomena generated when an image sensor in an electronic device detects light in both the visible wavelength spectrum and infrared to near-infrared wavelength spectrum.

Accordingly, in order to prevent or minimize the optical distortion phenomenon, light in the near-infrared and infrared spectrums needs to be absorbed or reflected.

SUMMARY

A near-infrared absorbing composition having near-infrared absorbance, solubility for an organic solvent, and moisture absorption resistivity and low visible absorbance is provided.

In addition, an optical structure formed using the near-infrared absorbing composition and a camera module and an electronic device including the same are provided.

According to an embodiment, a near-infrared absorbing composition includes a copper complex represented by Chemical Formula 1.

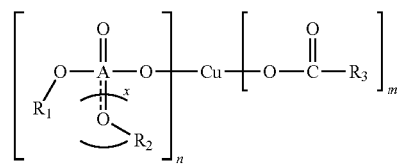

[Chemical Formula 1]

Wherein,

A is one of phosphorus and sulfur, $R_1$ and $R_2$ are each independently one of a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, and a cross-linking functional group, $R_3$ is one of a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, and a substituted or unsubstituted C3 to C20 heteroaryl group, provided that each of $R_1$, $R_2$, and $R_3$ does not include a hydroxyl group (—OH), x is 0 or 1, $1 \leq m \leq 4$, and $1 \leq n \leq 4$.

The cross-linking functional group may be represented by Chemical Formula Z.

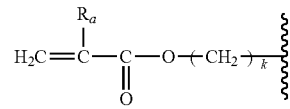

[Chemical Formula Z]

Wherein, $R^a$ is one of hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group, and k is an integer ranging from 0 to 8.

At least one of $R_1$ and $R_2$ may be the cross-linking functional group.

A may be phosphorus and both of $R_1$ and $R_2$ may be the cross-linking functional group.

The copper complex may be represented by Chemical Formula 2.

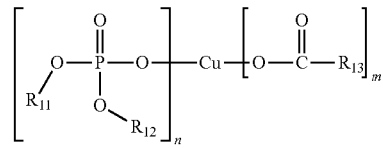

[Chemical Formula 2]

Wherein, $R_{11}$ and $R_{12}$ are each independently one of a substituted or unsubstituted C1 to C20 alkyl group, a substituted or unsubstituted C6 to C20 aryl group, a substituted or unsubstituted C3 to C20 heteroaryl group, and a cross-linking functional group represented by Chemical Formula Z, $R_{13}$ is one of a substituted or unsubstituted C1 to C20 alkyl group, a substituted or unsubstituted C6 to C20 aryl group, and a substituted or unsubstituted C3 to C20 heteroaryl group, provided that each of $R_{11}$, $R_{12}$, and $R_{13}$ does not include a hydroxyl group (—OH), $1 \leq m \leq 4$, and $1 \leq n \leq 4$.

$R_{11}$ and $R_{12}$ may each independently be one of a substituted or unsubstituted C1 to C20 alkyl group, a substituted or unsubstituted C6 to C20 aryl group, a substituted or unsubstituted C3 to C20 heteroaryl group, and the cross-linking functional group represented by Chemical Formula Z, provided that at least one of $R_{11}$ and $R_{12}$ may be the cross-linking functional group represented by Chemical Formula Z, and $R_{13}$ may be one of a substituted or unsubstituted C1 to C20 alkyl group, a substituted or unsubstituted C6 to C20 aryl group, and a substituted or unsubstituted C3 to C20 heteroaryl group.

The copper complex may be represented by Chemical Formula 3.

[Chemical Formula 3]

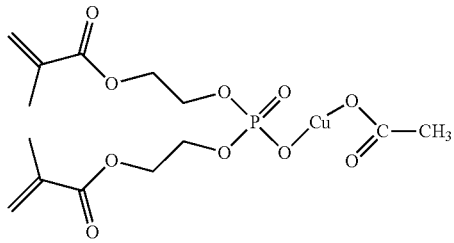

The near-infrared absorbing composition may further include a polymerizable monomer having a thermal polymerization property or a photo-polymerization property.

The polymerizable cross-linking monomer may be an acryl-based monomer, an epoxy-based monomer, or a combination thereof.

According to another embodiment, an optical structure includes a first near-infrared absorption layer formed using the aforementioned near-infrared absorbing composition.

The copper complex may be included in an amount of about 50 wt % to 100 wt % based on a total weight of the first near-infrared absorption layer.

The first near-infrared absorption layer may further include an acryl-based polymer, an epoxy-based polymer, or a combination thereof.

The near-infrared absorption layer may have a maximum absorption wavelength in a wavelength region of about 700 nm to about 950 nm.

The near-infrared absorption layer may have an average light transmittance of less than or equal to about 30% in a wavelength region of about 700 nm to about 950 nm.

The optical structure may further include a second near-infrared absorption layer including an organic dye which is distinct from the first near-infrared absorption layer.

The organic dye may include a polymethine compound, a phthalocyanine compound, a merocyanine compound, a naphthalocyanine compound, an immonium compound, a diimmonium compound, a triarylmethane compound, a dipyrromethene compound, an anthraquinone compound, a naphthoquinone compound, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

The optical structure may have an average light transmittance of less than or equal to about 20% in a wavelength region of about 700 nm to about 1100 nm.

The optical structure after being placed at a temperature of 80° C. under relative humidity of 85 RH % for 120 hours may exhibit a change of an average light transmittance of less than or equal to about 3% in a wavelength region of about 700 nm to about 1200 nm.

According to another embodiment, a camera module includes a lens; an image sensor; and the aforementioned optical structure disposed between the lens and the image sensor and/or an electronic device includes the optical structure.

The near-infrared absorbing composition according to an embodiment has improved near-infrared absorbance and low visible absorbance and simultaneously, improved moisture absorption resistivity and thus may minimize an optical distortion phenomenon in various environments such as a high temperature/high humidity environment and the like and provides a clear image. The near-infrared absorbing composition according to an embodiment has improved solubility for an organic solvent and thus may be easily formed into an optical structure having high coating properties and reliability.

Accordingly, a camera module and an electronic device including the optical structure may obtain an image having a minimized optical distortion phenomenon even in various environments such as high temperature/high humidity environment and the like.

DETAILED DESCRIPTION

Figure 1:
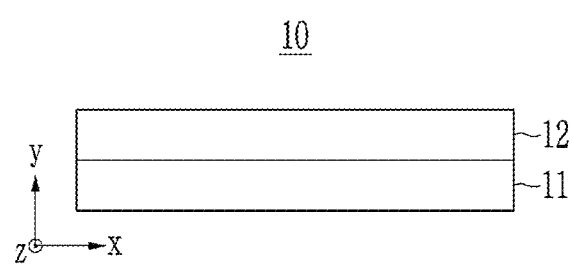
FIG. 1 is a schematic cross-sectional view showing an optical structure according to an embodiment.

Hereinafter, example embodiments will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Hereinafter, a near-infrared absorbing composition according to an embodiment is described.

A copper complex according to an embodiment includes heterogeneous ligands that coordinate with a copper ion. Specifically, the heterogeneous ligands may include a ligand derived from inorganic acid ester and a ligand derived from organic acid ester together.

Examples of the inorganic acid ester may be phosphoric acid ester, sulfuric acid ester, nitric acid ester, or a combination thereof and examples of the organic acid ester may be carboxylate ester.

More specifically, a near-infrared absorbing composition according to an embodiment may include a copper complex represented by Chemical Formula 1.

[Chemical Formula 1]

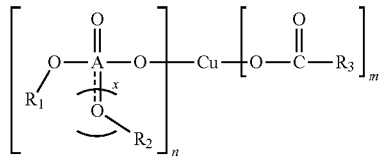

In Chemical Formula 1,
A is one of phosphorus and sulfur,
$R_1$ and $R_2$ are independently one of a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, and a cross-linking functional group,
$R_3$ is one of a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, and a substituted or unsubstituted C3 to C20 heteroaryl group, provided that each of $R_1$, $R_2$, and $R_3$ does not include a hydroxyl group (—OH),
x is 0 or 1,
$1 \leq m \leq 4$, and
$1 \leq n \leq 4$.

In an embodiment, the cross-linking functional group selected as $R_1$ to $R_2$ may be represented by Chemical Formula Z.

[Chemical Formula Z]

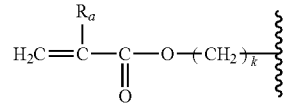

In Chemical Formula Z,
$R^a$ is one of hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group, and
k is an integer ranging from 0 to 8.

In an embodiment, at least one of $R_1$ and $R_2$ may be the cross-linking functional group represented by Chemical Formula Z.

In an embodiment, both of $R_1$ and $R_2$ may be the cross-linking functional group represented by Chemical Formula Z.

In an embodiment, the ligand derived from inorganic acid ester may be a ligand derived from phosphoric acid ester. In this case, in Chemical Formula 1, A may be phosphorus, and both of $R_1$ and $R_2$ may be the cross-linking functional group.

The copper complex may be represented by Chemical Formula 2.

[Chemical Formula 2]

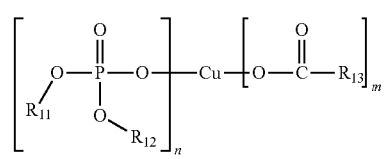

In Chemical Formula 2,
$R_{11}$ and $R_{12}$ are each independently one of a substituted or unsubstituted C1 to C20 alkyl group, a substituted or unsubstituted C6 to C20 aryl group, a substituted or unsubstituted C3 to C20 heteroaryl group, and a cross-linking functional group represented by Chemical Formula Z, $R_{13}$ is one of a substituted or unsubstituted C1 to C20 alkyl group, a substituted or unsubstituted C6 to C20 aryl group, and a substituted or unsubstituted C3 to C20 heteroaryl group, provided that each of $R_{11}$, $R_{12}$, and $R_{13}$ does not include a hydroxyl group (—OH),
$1 \leq m \leq 4$, and
$1 \leq n \leq 14$.

In the copper complex represented by Chemical Formula 2, $R_{11}$ and $R_{12}$ may each independently be one of a substituted or unsubstituted C1 to C20 alkyl group, a substituted or unsubstituted C6 to C20 aryl group, a substituted or unsubstituted C3 to C20 heteroaryl group, and the cross-linking functional group represented by Chemical Formula Z, provided that at least one of $R_{11}$ and $R_{12}$ may be the cross-linking functional group represented by Chemical Formula Z.

On the other hand, in the copper complex represented by Chemical Formula 2, $R_{13}$ may be one of a substituted or unsubstituted C1 to C20 alkyl group, a substituted or unsubstituted C6 to C20 aryl group, and a substituted or unsubstituted C3 to C20 heteroaryl group.

More specifically, the copper complex may be represented by Chemical Formula 3.

[Chemical Formula 3]

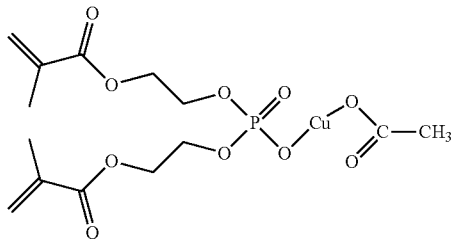

The near-infrared absorbing composition according to an embodiment may further include a solvent. In an embodiment, the solvent may be an organic solvent. Examples of the organic solvent may be tetrahydrofuran, ethanol, butanol, acetone, methylethylketone, 1-methoxy-2-propanol, cyclopentanone, or a combination thereof. In other words, the copper complex according to an embodiment may exhibit improved solubility in the organic solvent.

The near-infrared absorbing composition according to an embodiment may further include a polymerizable monomer having a thermal polymerization property or a photo-polymerization property. The polymerizable cross-linking monomer may be an acryl-based monomer, an epoxy-based monomer, or a combination thereof. The polymerizable cross-linking monomer may function as a binder during formation of a near-infrared absorption layer by using the near-infrared absorbing composition.

In an embodiment, the polymerizable cross-linking monomer has photo-polymerization property, and accordingly, the near-infrared absorbing composition may further include an additive for initiating a photo-polymerization reaction among the cross-linking monomers, for example, a photoinitiator and the like. However, an embodiment is not necessarily limited thereto. For example, the polymerizable cross-linking monomer may have thermal polymerization property, and accordingly, a different type of a polymer binder from the polymerizable cross-linking monomer, a surfactant, an antioxidizing agent, and the like may be further included as an additive.

On the other hand, the near-infrared absorbing composition according to an embodiment may further include an organic dye having near-infrared absorptivity in addition to the aforementioned copper complex. Examples of the organic dye may include a polymethine compound, a phthalocyanine compound, a merocyanine compound, a naphthalocyanine compound, an immonium compound, a diimmonium compound, a triarylmethane compound, a dipyrromethene compound, an anthraquinone compound, a naphthoquinone compound, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

The organic dye has a narrower line width of a near-infrared absorption wavelength is narrower than that of the copper complex and thus may be used together with the copper complex, when absorptivity regarding light in a particularly narrow wavelength region among near-infrared rays needs to be complemented. In other words, the near-infrared absorbing composition according to an embodiment may include the aforementioned copper complex and at least one type of an organic dye having absorptivity in a particular near-infrared wavelength region which needs to be complemented.

However, an embodiment is not necessarily limited thereto, and the near-infrared absorbing composition according to an embodiment may include the aforementioned copper complex but may not include the aforementioned organic dye. Herein, in order to adjust near-infrared absorptivity into a desired level, a layer including the organic dye may be separately formed from a layer formed of the near-infrared absorbing composition according to an embodiment. This will be specifically described later.

A general near-infrared absorbing material may be classified into an organic material and an inorganic material, and examples of the organic material may include the aforementioned organic dye, and examples of the inorganic material may include a soluble metal complex such as copper-phosphate and the like. This metal complex in general has a structure that at least one homogeneous ligand is combined to a central metal (e.g., copper).

The organic material has good near-infrared absorbance, but as described above, the aforementioned near-infrared absorption wavelength may have a narrow line width. Accordingly, the organic material alone may hardly absorb light in a broad near-infrared wavelength region ranging from about 700 nm to about 1200 nm, and accordingly, various types of organic materials need to be stacked. Herein, since light transmittance of a near-infrared absorption layer using the organic material in a visible wavelength region may be deteriorated, there is a limit in increasing the stack number of the near-infrared absorption layer.

The inorganic material has lower near-infrared absorbance than the organic material and thus may be formed into a little thicker near-infrared absorption layer than that of the organic material in order to secure absorbance (e.g., about 50 μm to about 200 μm). The inorganic material has improved light transmittance about a visible wavelength region, and accordingly, even though the thickness is increased, a light loss due to visible light absorption thereof may be small.

However, in order to realize the thickness, the inorganic material has to be dissolved at a high concentration (e.g., greater than or equal to about 50 wt %) in an organic solvent, a general inorganic material may have good solubility for a polar solvent (e.g., an alcohol-based solvent, an aqueous solution, and the like) but insufficient solubility for the organic solvent.

On the other hand, when a copper complex usable as the inorganic material is coordinated with an inorganic acid ester ligand, for example, a sulfuric acid ester ligand, a phosphoric acid ester ligand, and the like, the copper complex may show low absorbance resistance due to the ligand.

In addition, when the ligand included in the copper complex includes a hydroxyl group (—OH) at the terminal end, the copper complex may be combined with moisture through the hydroxyl group at the terminal end.

In this way, when the copper complex exhibits low absorbance resistance, an optical structure formed by using this may exhibit reliability deterioration, for example near-infrared absorbance deterioration due to the moisture. In addition, formation of a separate barrier layer in order to prevent or reduce this deterioration may have a negative influence on formation of the optical structure into a thin film.

However, the copper complex according to an embodiment simultaneously contains an inorganic acid ester ligand and an organic acid ester-based ligand which are a heterogeneous ligand, but the ligands include no hydroxyl group at the terminal end. Accordingly, the organic acid ester ligand attached to the copper complex may secure improved solubility for an organic solvent, while the inorganic acid ester ligand secures improved near-infrared absorptivity, and in addition, improved absorbance resistivity may also be secured by including the heterogeneous ligands together.

Accordingly, like the copper complex according to an embodiment, a copper complex having the heterogeneous ligands differing each other has improved solubility for an organic solvent and in addition, may adjust a maximum absorption wavelength of a near-infrared absorption layer formed of a near-infrared absorbing composition within a predetermined range, for example, greater than or equal to about 700 nm, and for example less than or equal to about 950 nm, or for example about 700 nm to about 950 nm, about 700 nm to about 900 nm, or about 750 nm to about 900 nm in various environments such a high temperature/high humidity environment and the like.

Accordingly, a near-infrared absorption layer formed by using the near-infrared absorbing composition according to an embodiment may be easily formed to have a thickness of about 50 μm to about 200 μm. In addition, the near-infrared absorption layer may exhibit improved near-infrared absorbance and low visible absorbance due to the aforementioned near-infrared absorbing composition.

Hereinafter, an optical structure according to an embodiment, that is, an optical structure including a near-infrared absorption layer manufactured using the composition is described with reference to drawings.

FIG. 1 is a schematic cross-sectional view showing an optical structure according to another embodiment.

Referring to FIG. 1, an optical structure 10 includes a first near-infrared absorption layer 12. In an embodiment, as one example of the optical structure 10, the first near-infrared absorption layer 12 is formed on a transparent substrate 11. However, the present scope is not necessarily limited thereto. For example, the optical structure according may be formed directly on an image sensor, not on a transparent substrate, or may be a film structure (e.g., thin-film structure) having a surface covered with a release paper or the like.

Also, the first near-infrared absorption layer 12 may be formed as a monolayer or a multilayer of at least two layers. In the case of the multiple layer, it may include an interlayer interfacial adhesive and/or an overcoating layer that prevents oxygen and moisture permeation. The first near-infrared absorption layer 12, and another layer performing near-infrared absorption and/or reflection may provide a multilayer.

In an embodiment, the transparent substrate 11 may be made of an optically transparent substrate and may have, for example an average light transmittance of greater than or equal to about 80% in a visible region. Herein, the visible region may be for example a wavelength region of greater than about 380 nm and less than about 700 nm and the average light transmittance is an average value of light transmittance measured when incident light is radiated in a vertical direction (front direction) of the transparent substrate 11.

The transparent substrate 11 may include, for example glass, polyethyleneterephthalate, polyethylenenaphthalate, triacetyl cellulose, polycarbonate, a cycloolefin polymer, poly(meth)acrylate, polyimide, polystyrene, or a combination thereof, but is not limited thereto.

The transparent substrate 11 may selectively absorb at least one a portion of light in an ultraviolet (UV) region. Ultraviolet (UV) absorptivity of the transparent substrate 11 may be caused by a material itself of the transparent substrate 11, but the transparent substrate 11 having ultraviolet (UV) absorptivity may be formed by adding an ultraviolet (UV) absorber thereto. Herein, the ultraviolet (UV) region may be, for example, a wavelength region of less than or equal to about 380 nm.

The transparent substrate 11 may absorb most of light in a wavelength region of at least about 350 nm to about 380 nm, and thus an average light transmittance of the optical structure 10 in a wavelength region of about 350 nm to about 380 nm may be less than or equal to about 1%, less than or equal to about 0.8%, or less than or equal to about 0.5%.

The transparent substrate 11 may include various additives according to desirable properties of the optical structure 10 as needed.

The transparent substrate 11 may have a thickness of about 20 μm to about 120 μm.

The transparent substrate 11 may be formed as a multilayer of at least two layers if needed, or may be omitted.

The first near-infrared absorption layer 12 is configured to transmit light in a visible region and to selectively absorb at least a portion of light in a near-infrared region. Herein, the visible region may be for example a wavelength region of greater than about 380 nm and less than about 700 nm and the near-infrared region may be for example a wavelength region of about 700 nm to about 1200 nm.

The first near-infrared absorption layer 12 includes the aforementioned copper complex and may further include a thermally polymerizable or photo-polymerizable polymer, a surfactant, an anti-oxidizing agent, a photoinitiator, and the like.

In an embodiment, the aforementioned copper complex in the first near-infrared absorption layer 12 may be included in an appropriate amount so that the first near-infrared absorption layer 12 may have a desirable near-infrared absorptivity.

In an embodiment, the copper complex may be for example included in an amount of greater than or equal to about 50 wt %, greater than or equal to about 60 wt %, greater than or equal to about 70 wt %, greater than or equal to about 80 wt %, greater than or equal to about 90 wt %, greater than or equal to about 95 wt %, or even about 100 wt % (the first near-infrared absorption layer consists of the copper complex) based on the total weight of the first near-infrared absorption layer 12.

In an embodiment, the thermally polymerizable or photo-polymerizable polymer may be prepared by polymerizing a polymerizable cross-linkable monomer included in the aforementioned optical structure by heat or light. Examples of the polymer may be an acryl-based polymer, an epoxy-based polymer, or a combination thereof.

The first near-infrared absorption layer 12 may be formed by coating the near-infrared absorbing composition on the transparent substrate 11 and polymerizing the thermally polymerizable or photo-polymerizable cross-linkable monomer. In other words, the first near-infrared absorption layer 12 may be formed through a polymerization reaction of the polymerizable cross-linkable monomer in the near-infrared absorbing composition.

The polymerization reaction may be different depending on characteristics of the polymerizable cross-linkable monomer forming the polymer, for example, performed by heat and/or light.

The composition coated on the transparent substrate 11 may be selectively curable by heat and/or light and the coating may be for example a spin coating, a slit coating, a bar coating, a blade coating, a slot die coating, and/or an inkjet coating.

The first near-infrared absorption layer 12 of the optical structure 10 may have, for example a thickness of about 10 μm to about 200 μm, for example about 50 μm to about 200 μm, or about 50 μm to about 150 μm. Within the thickness ranges, the optical structure 10 may realize performance of an optical filter.

However, an embodiment is necessarily limited thereto, a thickness of the first near-infrared absorption layer 12 may be variously set with a consideration to types of the copper complexes in the first near-infrared absorption layer 12 and their relationships with other constituent elements constituting the optical structure, for example, a transparent substrate, a second near-infrared absorption layer and/or infrared reflection layer which will be described later, and the like.

The optical structure 10 according to the present embodiment transmits light in a visible region effectively and blocks light in a near-infrared region effectively, even if the transparent substrate 11 and the first near-infrared absorption layer 12 are sequentially stacked.

In addition, light in an ultraviolet (UV) region may be effectively blocked by imparting an absorption function of light in an ultraviolet (UV) region to the transparent substrate 11. Accordingly, the optical structure 10 may effectively sense light in a visible region in a sensor sensing light such as an image sensor by increasing purity of transmittance of light in a visible region of light in all wavelength regions and thus optical distortion by light besides the visible region may be decreased or prevented.

For example, the optical structure 10 including the first near-infrared absorption layer 12 may have an average light transmittance of greater than or equal to about 70% in a wavelength region of about 435 nm to about 565 nm and an average light transmittance of less than or equal to about 30% in a wavelength region of about 700 nm to about 950 nm. The average light transmittance is an average value of light transmittance measured when incident light is radiated in a vertical direction (front direction) of the optical structure 10.

For example, the optical structure 10 including the first near-infrared absorption layer 12 may exhibit a change of an average light transmittance of less than or equal to about 3% in a wavelength region of about 700 nm to about 1200 nm.

Herein, the aforementioned temperature, humidity, and placing time conditions are a stringent environment of high temperature/high humidity, and the change of the average light transmittance is a difference in the average light transmittance of the optical structure 10 after the condition application, as compared with the average light transmittance of the optical structure 10 before the condition application.

In this way, the optical structure 10 may selectively absorb and thus block light in a near-infrared wavelength region corresponding to a boundary between a visible region and an infrared region out of all the wavelength region and thus reduces or prevents crossing and mingling of a signal by light in a visible region with a signal by light in a nonvisible region and resultantly, may reduce or prevent an optical distortion such as a crosstalk.

In addition, the optical structure 10 may effectively absorb light in a near-infrared region regardless of an incident direction and accordingly, effectively absorb and block incident light in a near-infrared region from a side direction and thus reduce or prevent the incident light in a near-infrared region from a side direction from distorting the signal by light in a visible region.

In addition, the optical structure 10 may exhibit improved moisture absorption resistivity, improved near-infrared absorbance, and low visible absorbance due to the aforementioned first near-infrared absorbing composition. Furthermore, the optical structure 10 has improved solubility for an organic solvent and thus improved coating properties (coating uniformity, coating easiness, and the like) and also improved reliability about optical properties of the first near-infrared absorption layer 12.

Figure 2:
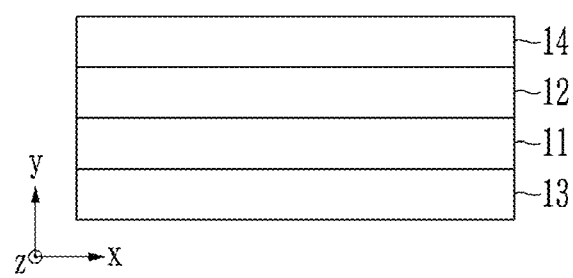
FIG. 2 is a schematic cross-sectional view showing an optical structure according to an exemplary variation.

FIG. 2 is a schematic cross-sectional view showing an optical structure according to one exemplary variation.

Referring to FIG. 2, the optical structure 10 according to one exemplary variation includes a transparent substrate 11, a first near-infrared absorption layer 12, and infrared reflection layers 13 and 14.

The transparent substrate 11 and the first near-infrared absorption layer 12 are the same as described above.

The infrared reflection layers 13 and 14 may be disposed on at least one of one surface of the transparent substrate and one surface of the first near-infrared absorption layer 12. For example, the infrared reflection layers 13 and 14 may be disposed under the transparent substrate 11 and/or on the first near-infrared absorption layer 12. In the drawing, the infrared reflection layers 13 and 14 are shown, but either may be omitted.

The infrared reflection layers 13 and 14 effectively reflect light in an infrared wavelength region and thus may effectively reduce or prevent optical distortion by the light in an infrared wavelength region.

The infrared reflection layers 13 and 14 may reflect a portion of a near-infrared region, for example a wavelength region of about 700 nm to about 1200 nm.

The infrared reflection layers 13 and 14 are not particularly limited as long as they reflect light in an infrared wavelength region and may be, for example a high refractive-index reflective layer, a reflective layer including a high refractive-index nanoparticle, or a multilayer including a plurality of layers having different refractive indexes, but is not limited thereto.

For example, the infrared reflection layers 13 and 14 may include a first layer and a second layer consisting materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges, for example the first layer may have a refractive index of greater than or equal to about 1.1 and less than about 1.7 and the second layer may have a refractive index about 1.7 to about 2.7, or for example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, or a combination thereof and the second layer may include titanium oxide, zinc oxide, indium oxide, zirconium oxide, or a combination thereof. The first layer and the second layer may be, for example five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The optical structure 10 may have, for example a thickness of about 10 μm to about 300 μm. Within the ranges of the thickness, an infrared absorption optical filter may be realized.

The optical structure 10 according to the present embodiment includes the transparent substrate 11 and the first near-infrared absorption layer 12 like the aforementioned embodiment and transmits light in a visible region effectively and blocks light in a near-infrared region effectively. In addition, the optical structure 10 according to the embodiment further includes infrared reflection layers 13 and 14, thereby effectively blocks light in a mid-infrared region and a far-infrared region by reflecting them, and thus may be effectively used as an optical filter preventing transmittance of light in all the infrared regions. Accordingly, the optical structure 10 may be applied to an electronic device and thus may reduce or prevent distortion of an optical signal in a visible region by light in the infrared region.

Figure 3:
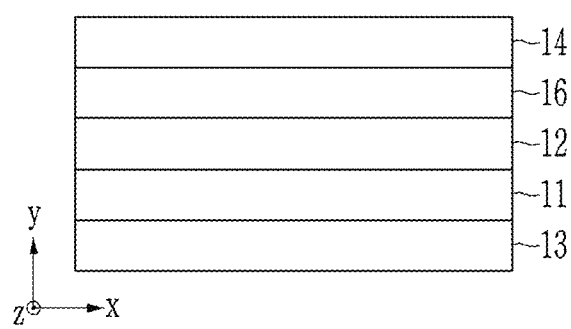
FIG. 3 is a schematic cross-sectional view showing an optical structure according to another exemplary variation.

FIG. 3 is a schematic cross-sectional view showing an optical structure according to another exemplary variation.

Referring to FIG. 3, an optical structure 10 according to another exemplary variation includes a transparent substrate 11, a first near-infrared absorption layer 12, a second near-infrared absorption layer 16, and infrared reflection layers 13 and 14.

The transparent substrate 11, the first near-infrared absorption layer 12, and the infrared reflection layers 13 and 14 are the same as described above.

The second near-infrared absorption layer 16 is a layer which is distinct from the aforementioned first near-infrared absorption layer 12 as shown in FIG. 3 and may include the aforementioned organic dye. Accordingly, the first near-infrared absorption layer 12 may be used to absorb light in a wide near-infrared wavelength region and in addition, complemented by the second near-infrared absorption layer 16 including an organic dye having absorptivity with respect to a particular near-infrared wavelength region.

Specifically, for example, when the organic dye used for the second near-infrared absorption layer 16 exhibits a little deteriorated near-infrared absorptivity in about 850 nm wavelength region, the first near-infrared absorption layer 12 for example having a maximum absorption wavelength of about 700 nm to about 950 nm may be used therewith, as described above, and accordingly, the optical structure 10 according to an exemplary variation may exhibit improved near-infrared absorptivity over all the near-infrared wavelength region.

The organic dye included in the second near-infrared absorption layer 16 may include a polymethine compound, a phthalocyanine compound, a merocyanine compound, a naphthalocyanine compound, an immonium compound, a diimmonium compound, a triarylmethane compound, a dipyrromethene compound, an anthraquinone compound, a naphthoquinone compound, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof, as described above.

The second near-infrared absorption layer 16 may be formed as a monolayer or a multilayer of at least two layers. In the case of the multiple layer, it may include an interlayer interfacial adhesive and/or an overcoating layer that prevents oxygen and moisture permeation.

On the other hand, an interlayer interfacial adhesive and/or an overcoating layer that prevents oxygen and moisture permeation may be also included between the first near-infrared absorption layer 12 and the second near-infrared absorption layer 16.

The optical structure 10 according to an exemplary variation includes the transparent substrate 11 and the first near-infrared absorption layer 12 like the aforementioned embodiments and additionally, the second near-infrared absorption layer 16 and thus may further improve blocking performance of light in a near-infrared region.

For example, the optical structure 10 including the first near-infrared absorption layer 12 and the second near-infrared absorption layer 16 may have an average light transmittance of, for example, greater than or equal to about 70% in a wavelength region of about 500 nm to about 565 nm and for example may have an average light transmittance of, for example less than or equal to about 20% in a wavelength region of about 700 nm to about 1100 nm.

For example, the optical structure 10 including the first near-infrared absorption layer 12 and the second near-infrared absorption layer 16 may exhibit a change of an average light transmittance of less than or equal to about 3% in a wavelength region of about 700 nm to about 1200 nm.

As for the optical structure 10 according to an exemplary variation, the blocking performance of light in a near-infrared region may not only be applied to a broader wavelength region, but also improved near-infrared absorbance and visible light transmittance may be obtained in a harsh environment such as a high temperature/high humidity environment.

The aforementioned optical structure 10 may be applied to all uses for filtering light in an infrared or near-infrared wavelength region, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 4:
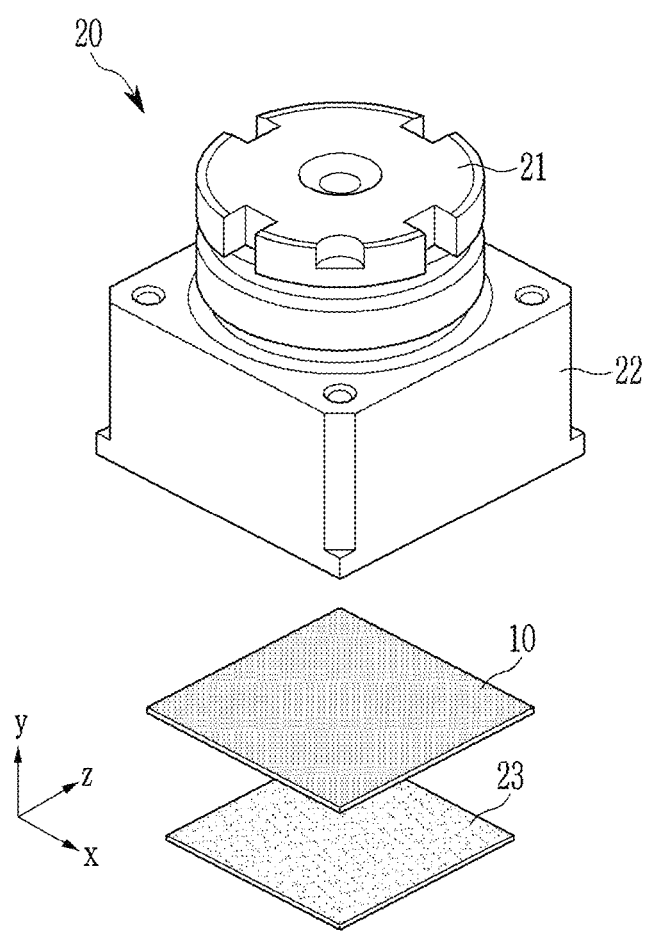
FIG. 4 is a schematic view showing a camera module according to an embodiment.

FIG. 4 is a schematic view showing a camera module according to an embodiment.

Referring to FIG. 4, a camera module 20 includes a lens barrel 21, a housing 22, an optical structure 10, and an image sensor 23.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 23 through the lens barrel 21 and the optical structure 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The optical structure 10 is the same as described above.

The image sensor 23 may concentrate an image of a subject and thus store it as data, and the stored data may be displayed as an image through a display media.

The image sensor 23 may be mounted in a substrate (not shown) and electrically connected to the substrate. The substrate may be, for example, a printed circuit board (PCB) or electrically connected to a printed circuit board, and the printed circuit may be, for example, a flexible printed circuit (FPCB).

The image sensor 23 concentrates light passing the lens barrel 21 and the optical structure 10 and generates a video signal and may be a complementary metal-oxide semiconductor (CMOS) image sensor and/or a charge coupled device (CCD) image sensor.

Figure 5:
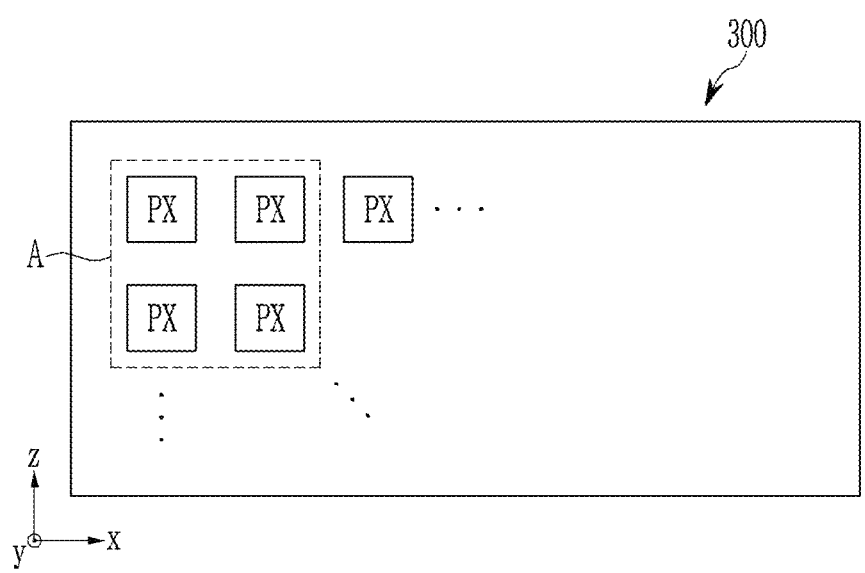
FIG. 5 is a schematic view showing an example of a pixel array of a sensor according to some example embodiments.

FIG. 5 is a schematic view showing an example of a pixel array of a sensor according to some example embodiments Referring to FIG. 5, a sensor 300 according to some example embodiments includes a plurality of pixels (PX) and the plurality of pixels (PX) may have a matrix array repeatedly arranged along rows and columns. The plurality of pixels (PX) may form ("at least partially comprise") a unit pixel group (A) of for example a 2×2 array of pixels, for example as shown in FIG. 4. However, an arrangement of the pixels are not limited thereto but variously modified, and the unit pixel group (A) may be variously modified into different arrays of pixels, including a 3×3 array, a 4×4 array, or the like, besides the 2×2 array.

At least a part of the pixels may include a plurality of sensors having different functions inside one pixel, and the plurality of sensors may be stacked therein. In some example embodiments, each pixel (PX) may include two or more sensors that are configured to sense (e.g., absorb) light in different wavelength regions ("wavelength spectra of light") in relation to each other, and the sensors configured to sense the light in different wavelength regions each other may be stacked in a direction that is perpendicular (e.g., perpendicular within manufacturing tolerances and/or material tolerances) to a top surface 110S of a substrate of the sensor 300, as shown in at least FIG. 6 (e.g., a Y direction). Herein, the light of the different wavelength regions may be respectively selected from a visible wavelength region; an infra-red wavelength region including a near infra-red wavelength region; and an ultraviolet (UV) wavelength region.

Figure 6:
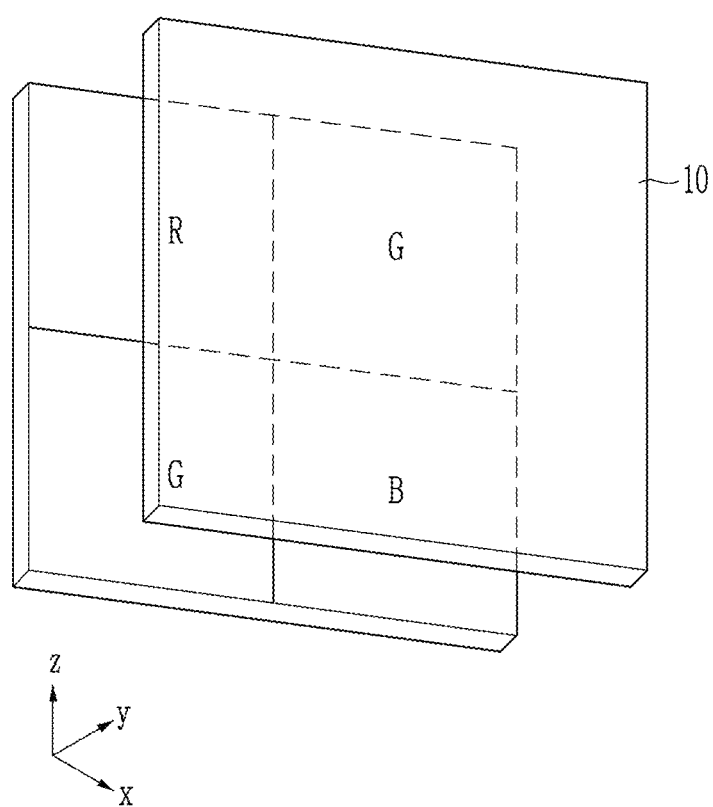
FIG. 6 is a top plan view showing an organic image sensor as one example of an image sensor.

FIG. 6 is a top plan view showing an organic image sensor as one example of an image sensor.

Referring to FIG. 6, the organic image sensor may be formed by arranging a red organic photoelectric device, a green organic photoelectric device, and a blue organic photoelectric device as Bayer shape in a monolayer on an optical structure, as shown in FIG. 6.

However, an embodiment is necessarily limited thereto, a detailed structures of organic image sensors may be variously set with a kind of materials and structures of the optical structure, and the like.

Figure 7:
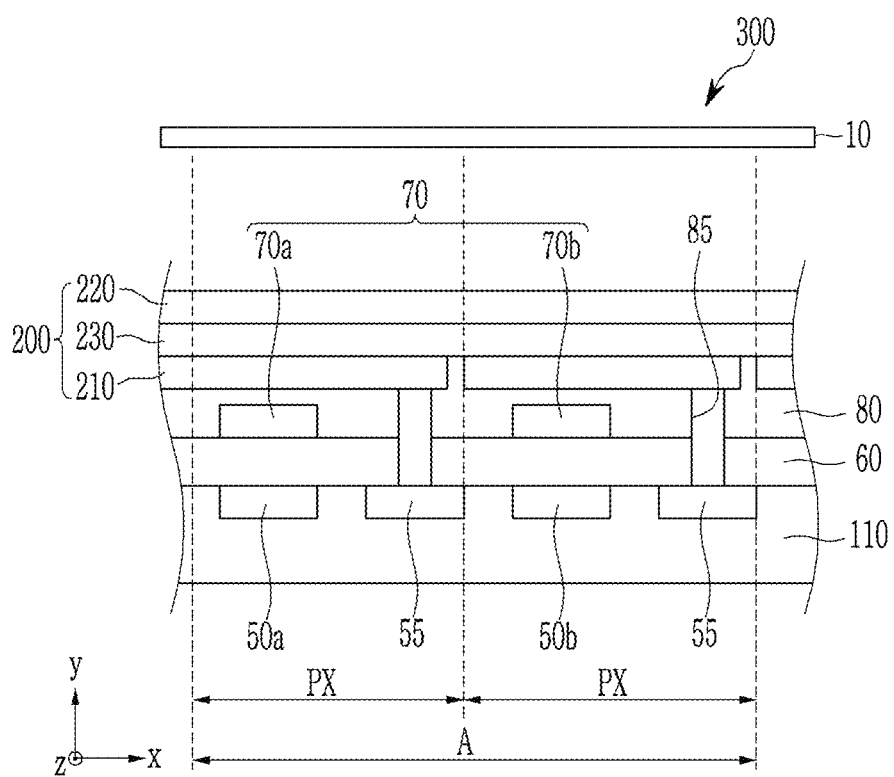
FIG. 7 is a cross-sectional view showing another example of an image sensor.

FIG. 7 is a cross-sectional view showing another example of the organic image sensor, Referring to FIG. 7, an organic image sensor 300 according to an embodiment includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 100.

The semiconductor substrate 110 may be a silicon substrate, and is integrated with the photo-sensing devices 50a and 50b, the transmission transistor (not shown), and the charge storage 55. The photo-sensing devices 50a and 50b may be photodiodes.

The photo-sensing devices 50a and 50b sense light, the information sensed by the photo-sensing devices may be transferred by the transmission transistor, the charge storage 55 is electrically connected to the organic photoelectric device 200, and the information of the charge storage 55 may be transferred by the transmission transistor.

The photo-sensing devices 50a and 50b sense light, the information sensed by the photo-sensing devices may be transferred by the transmission transistor, the charge storage 55 is electrically connected to the organic photoelectric device 200, and the information of the charge storage 55 may be transferred by the transmission transistor.

A metal wire (not shown) and a pad (not shown) are formed on the semiconductor substrate 110. In order to decrease signal delay, the metal wire and pad may be made of a metal having low resistivity, for example, aluminum (Al), copper (Cu), silver (Ag), and alloys thereof, but is not limited thereto. However, it is not limited to the structure, and the metal wire and pad may be disposed under the photo-sensing devices 50a and 50b.

The lower insulation layer 60 is formed on the metal wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70a formed in the blue pixel and a red filter 70b formed in the red pixel. In the present embodiment, a green filter is not included, but a green filter may be further included.

The upper insulation layer 80 is formed on the color filter layer 70. The upper insulation layer 80 eliminates a step caused by the color filter layer 70 and smoothens the surface. The upper insulation layer 80 and lower insulation layer 60 may include a contact hole (not shown) exposing a pad, and a through hole 85 exposing the charge storage 55 of a green pixel.

The organic photoelectric device 200 is formed on the upper insulation layer 80. The organic photoelectric device 200 includes a lower electrode 210 and an upper electrode 220 facing each other and an absorption layer 230 disposed between the lower electrode 210 and the upper electrode 220.

The lower electrode 210 and the upper electrode 220 may be all light-transmitting electrodes and the absorption layer 230 may selectively absorb light in a green wavelength region and may replace a color filter of a green pixel.

In this way, the semiconductor substrate 110 and the organic photoelectric device 200 selectively absorbing light in a green wavelength region have a stacking structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIG. 7, a structure where the organic photoelectric device selectively absorbing light in a green wavelength region is stacked on the semiconductor substrate 110 is illustrated, but the present disclosure is not limited thereto. An organic photoelectric device selectively absorbing light in a blue wavelength region may be stacked on the semiconductor substrate 110 and a green photo-sensing device and a red photo-sensing device may be integrated in the semiconductor substrate 110 or an organic photoelectric device selectively absorbing light in a red wavelength region may be stacked on the semiconductor substrate 110 and a green photo-sensing device and a blue photo-sensing device may be integrated in the semiconductor substrate 110.

Among the light in a visible region passing the lens barrel 21 and the optical structure 10, light in a green wavelength region may be mainly absorbed in the absorption layer 30 and photoelectrically converted, and light in a blue wavelength region and a red wavelength region may pass the lower electrode 210 and be sensed by the photo-sensing devices 50a and 50b.

As described above, the optical structure 10 has improved near-infrared absorbance and low visible absorbance in various environments such as a high temperature/high humidity environment and the like and thereby may transfer light in a pure visible region to an image sensor and resultantly, reduce or prevent a crosstalk generated when a signal by light in a visible region is crossed and mixed with a signal by light in a non-visible region. Accordingly, an optical distortion phenomenon of the image sensor for example due to a used environment such as a high humidity environment and the like may be minimized, and a clear image may be obtained.

Figure 8:
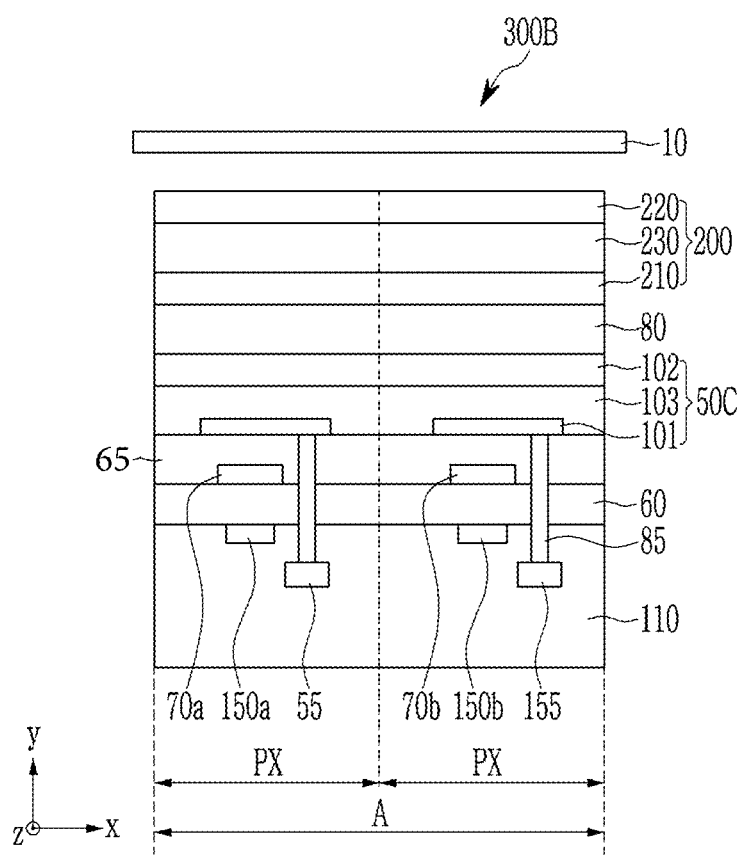
FIG. 8 is a cross-sectional view showing another example of an image sensor.

Referring to FIG. 8, the sensor 300B according to some example embodiments includes the visible light sensor 50, the organic photoelectric device 200, and the optical structure 10 as described above.

Referring to FIG. 8, in the sensor 300B according to some example embodiments, the visible light sensor 50 may be a combination of a photodiode integrated in the semiconductor substrate 110 and a photoelectric device disposed on the semiconductor substrate 110, and the organic photoelectric device 200 may be a separate photoelectric device. In some example embodiments, the same illustration as FIG. 6 will not be repeated, and accordingly, a description of the same constituent elements as those of FIG. 6 will be omitted.

In the semiconductor substrate 110, the blue sensor 50a, the red sensor 50b, the charge storage 55, and a transmission transistor (not shown) are integrated. The blue sensor 50a and the red sensor 50b are photodiodes and spaced apart from each other in a horizontal direction of the semiconductor substrate 110. The blue sensor 50a is integrated in a blue pixel, and the red sensor 50b is integrated in a red pixel.

On the semiconductor substrate 110, the lower insulation layer 60 and the color filter layer 70 are formed. The color filter layer 70 includes a blue filter 70a overlapped with the blue sensor 50a and a red filter 70b overlapped with the red sensor 50b.

An intermediate insulation layer 65 is formed on the color filter layer 70. The lower insulation layer 60 and the intermediate insulation layer 65 may have a through hole 85 exposing the charge storage 140. The through hole 85 may be filled with fillers. At least one of the lower insulation layer 60 and intermediate insulation layer 65 may be omitted.

On the intermediate insulation layer 65, the green sensor 50c is formed. The green sensor 50c may be a photoelectric device and formed at the whole surface of the sensor 23E. The green sensor 50c includes a lower electrode 101 and an upper electrode 102 facing each other, and a green light absorption layer 103 between lower electrode 101 and upper electrode 102. One of the lower electrode 101 and the upper electrode 102 is an anode and the other is a cathode.

Both of the lower electrode 101 and the upper electrode 102 may be a light-transmitting electrode, and the light-transmitting electrode may be made of, in some example embodiments, a transparent conductor such as indium tin oxide (ITO) or indium zinc oxide (IZO), or may be a metal thin layer having a thin thickness of several nanometers or several tens of nanometers or a metal thin layer having a thin thickness of several nanometers to several tens of nanometers doped with a metal oxide.

Figure 9:
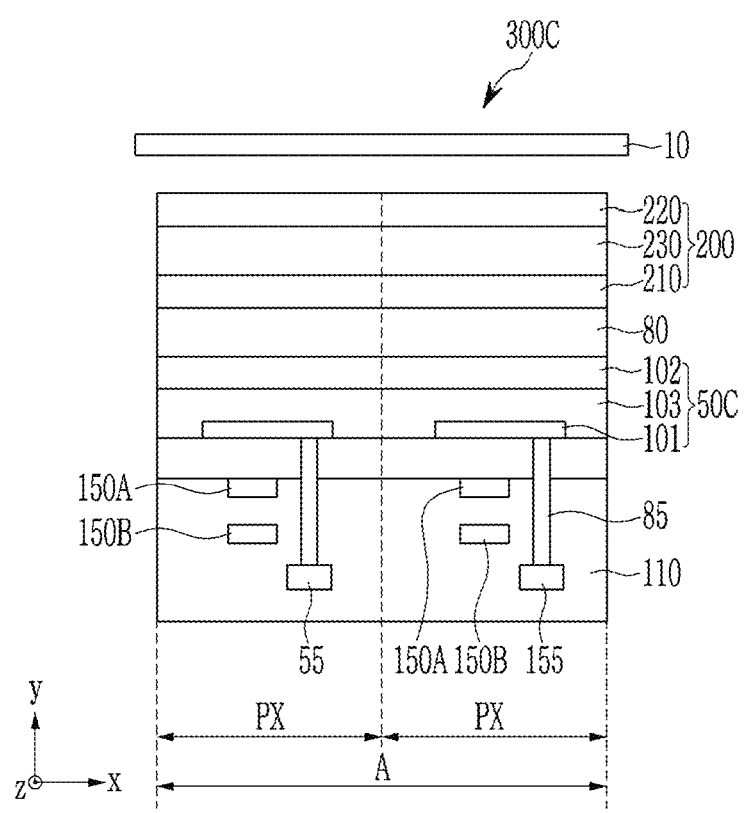
FIG. 9 is a cross-sectional view showing another example of an image sensor.

FIG. 9 is a cross-sectional view that schematically shows another example of a sensor according to some example embodiments.

Referring to FIG. 9, the sensor 300C according to some example embodiments includes the visible light sensor 50, the organic photoelectric device 200, and the optical structure 10 like that of some example embodiments. The visible light sensor 50 includes the blue sensor 50a and the red sensor 50b integrated in the semiconductor substrate 110 and a green sensor 50c disposed on the semiconductor substrate 110, wherein the blue sensor 50a and the red sensor 50b may be photodiodes, and the green sensor 50c may be a photoelectric device. The organic photoelectric device 200 may be a photoelectric device. The green sensor 50c includes a lower electrode 101, a green light absorption layer 103, and an upper electrode 102, and the organic photoelectric device 200 includes a lower electrode 210, a near infra-red absorption layer 230, and an upper electrode 220.

However, in the sensor 300C according to some example embodiments, the blue sensor 50a and the red sensor 50b integrated in the semiconductor substrate 110 are stacked in a vertical direction. The blue sensor 50a and the red sensor 50b may be configured to selectively absorb light in each wavelength region depending on a stacking depth and thus sense it. In other words, the red sensor 50b configured to absorb red light in a long wavelength region is disposed deeper from the surface of the semiconductor substrate 110 than the blue sensor 50a configured to absorb blue light in a short wavelength region. In this way, the color filter layer 70 may be omitted by separating absorption wavelengths depending on the stacking depth.

Figure 10:
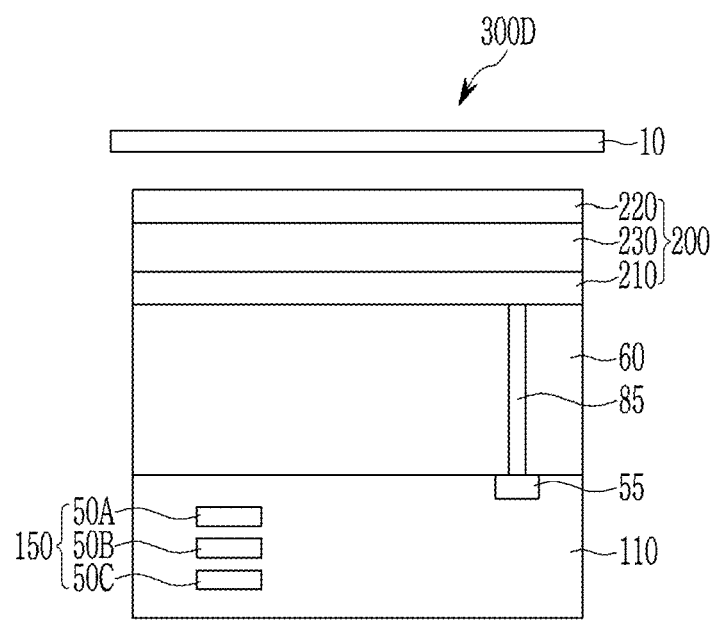
FIG. 10 is a cross-sectional view showing another example of an image sensor.

FIG. 10 is a cross-sectional view that schematically shows another example of a sensor according to some example embodiments.

Referring to FIG. 10, the sensor 300D according to some example embodiments includes the visible light sensor 50, the organic photoelectric device 200, and the optical structure 10 like that of some example embodiments. The visible light sensor 50 includes the blue sensor 50a and the red sensor 50b integrated in the semiconductor substrate 110 and a green sensor 50c disposed on the semiconductor substrate 110, wherein the blue sensor 50a and the red sensor 50b may be photodiodes, and the green sensor 50c may be a photoelectric device. The organic photoelectric device 200 may be a photoelectric device. The green sensor 50c includes a lower electrode 101, a green light absorption layer 103, and an upper electrode 102, and the organic photoelectric device 200 includes a lower electrode 210, a near infra-red absorption layer 230, and an upper electrode 220.

However, in the sensor 300D according to some example embodiments, the blue sensor 50a and the red sensor 50b integrated in the semiconductor substrate 110 are stacked in a vertical direction. The blue sensor 50a and the red sensor 50b may be configured to selectively absorb light in each wavelength region depending on a stacking depth and thus sense it. In other words, the red sensor 50b configured to absorb red light in a long wavelength region is disposed deeper from the surface of the semiconductor substrate 110 than the blue sensor 50a configured to absorb blue light in a short wavelength region. In this way, the color filter layer 70 may be omitted by separating absorption wavelengths depending on the stacking depth.

Figure 11:
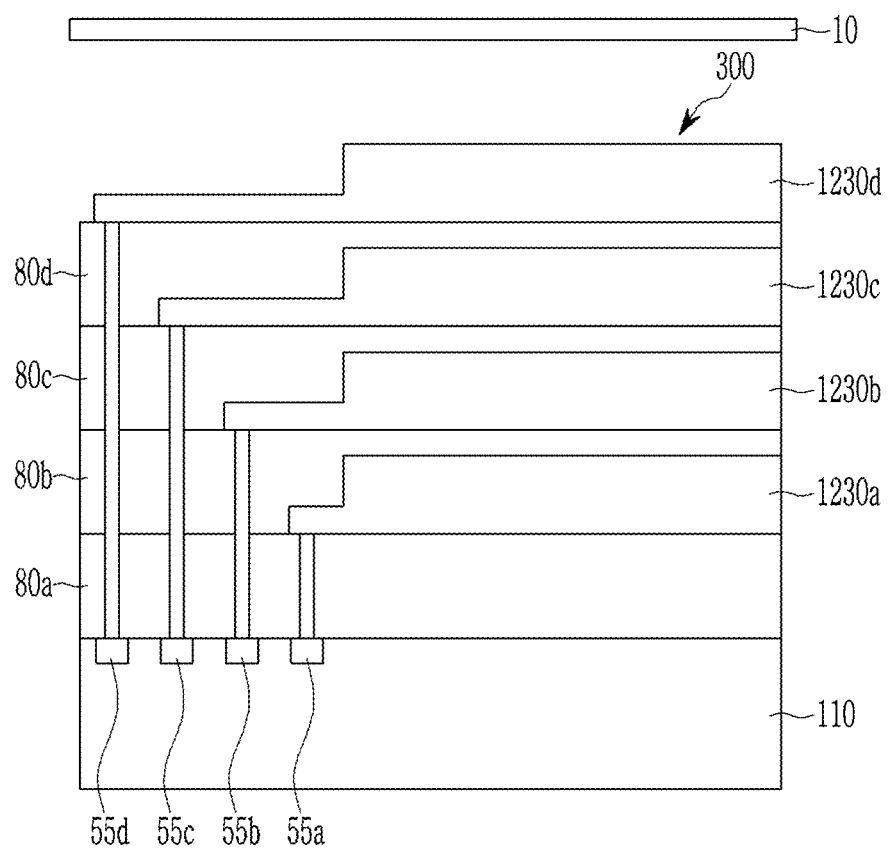
FIG. 11 is a cross-sectional view showing another example of the organic image sensor.

FIG. 11 is a cross-sectional view showing a sensor 300E according to some example embodiments.

Referring to FIG. 11, the sensor 300E according to some example embodiments includes an optical filter, an infrared/near infrared photoelectric diode configured to selectively absorb light in an infrared/near infrared wavelength spectrum of light, a red photoelectric diode configured to selectively absorb and convert (into electric signals) light in a red wavelength spectrum of incident light, a green photoelectric diode configured to selectively absorb and convert (into electric signals) light in a green wavelength spectrum of incident light, a blue photoelectric diode configured to selectively absorb and convert (into electric signals) light in a blue wavelength spectrum of incident light, and they are stacked in the vertical direction (e.g., Z-direction). Accordingly, it will be understood that, as shown in FIG. 10, the sensor 23E may include a plurality of photoelectric diodes 1200a-1200d that are stacked vertically on the semiconductor substrate 110, such that the plurality of photoelectric diodes 1200a-1200d overlap each other in a direction extending perpendicular to a top surface 110S of the semiconductor substrate 110.

The sensor 300E according to some example embodiments includes a semiconductor substrate 110, a lower insulation layer 80a, an intermediate insulation layer 80b, another intermediate insulation layer 80c, an upper insulation layer 80d, a first photoelectric diode 1200a, a second photoelectric diode 1200b, a third photoelectric diode 1200c, and a fourth photoelectric diode 1200d. As shown, the first to fourth photoelectric diode 1200a to 1200d are stacked vertically on the semiconductor substrate 110, such that the first to fourth photoelectric diode 1200a to 1200d overlap each other in a direction extending perpendicular to a top surface 110S of the semiconductor substrate 110.

The semiconductor substrate 110 may be a silicon substrate, and is integrated with the transmission transistor (not shown) and charge storages.

The first photoelectric diode 1200a is formed on the lower insulation layer 80a. The first photoelectric diode 1200a includes a photoelectric conversion layer 1230a. The first photoelectric diode 1200a may be any one of the photoelectric diodes described herein with reference to FIGS. 6-9. The photoelectric conversion layer 1230a may selectively absorb and convert (into electric signals) light in one of infrared, red, blue, and green wavelength spectra of incident light. For example, the first photoelectric diode 1200a may be a blue photoelectric diode.

An intermediate insulation layer 80b is formed on the first photoelectric diode 1200a.

The second photoelectric diode 1200b is formed on the intermediate insulation layer 80b. The second photoelectric 1200b includes a photoelectric conversion layer 1230b. The second photoelectric diode 1200b may be any one of the photoelectric diodes described herein with reference to FIGS. 1-7. The photoelectric conversion layer 1230b may selectively absorb and convert (into electric signals) light in one of infrared, red, blue, and green wavelength spectra of incident light. For example, the second photoelectric diode 1200b may be a green photoelectric diode.

Another intermediate insulation layer 80c is formed on the second photoelectric diode 1200b.

The third photoelectric diode 1200c is formed on the intermediate insulation layer 80c. The third photoelectric diode 1200c includes a photoelectric conversion layer 1230c. The third photoelectric diode 1200c may be any one of the photoelectric diodes described herein with reference to FIGS. 6-9. The photoelectric conversion layer 1230c may selectively absorb and convert (into electric signals) light in one of infrared, red, blue, and green wavelength spectra of incident light. For example, the third photoelectric diode 1200c may be a red photoelectric diode.

The upper insulation layer 80d is formed on the third photoelectric diode 1200c.

The lower insulation layer 80a, the intermediate insulation layers 80b and 80c, and the upper insulation layer 80d have a plurality of through holes exposing the charge storages 55a, 55b, 55c, and 55d.

The fourth photoelectric diode 1200d is formed on the upper insulation layer 80d. The fourth photoelectric diode 1200d includes a photoelectric conversion layer 1230d. The fourth photoelectric diode 1200d may be any one of the photoelectric diodes described herein with reference to FIGS. 7-10. The photoelectric conversion layer 1230d may selectively absorb light in one of infrared, red, blue, and green wavelength spectra of light. For example, the fourth photoelectric diode 1200d may be an infrared/near infrared photoelectric diode.

As shown, an optical structure 10 may be on the fourth photoelectric diode 1200d.

In the drawing, the first photoelectric diode 1200a, the second photoelectric diode 1200b, the third photoelectric diode 1200c, and the fourth photoelectric diode 1200d are sequentially stacked, but the present disclosure is not limited thereto, and they may be stacked in various orders.

As described above, the first photoelectric diode 1200a, the second photoelectric diode 1200b, the third photoelectric diode 1200c, and the fourth photoelectric diode 1200d have a stack structure, and thus the size of an image sensor may be reduced to realize a down-sized image sensor.

Figure 12:
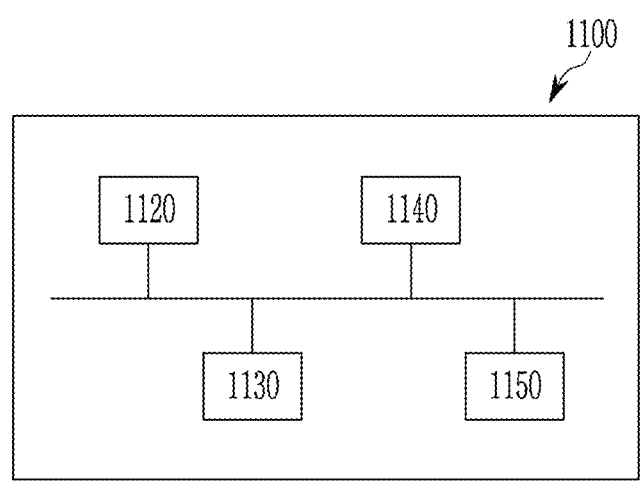
FIG. 12 is a schematic diagram of an electronic device 1100 according to some example embodiments.
Figure 13:
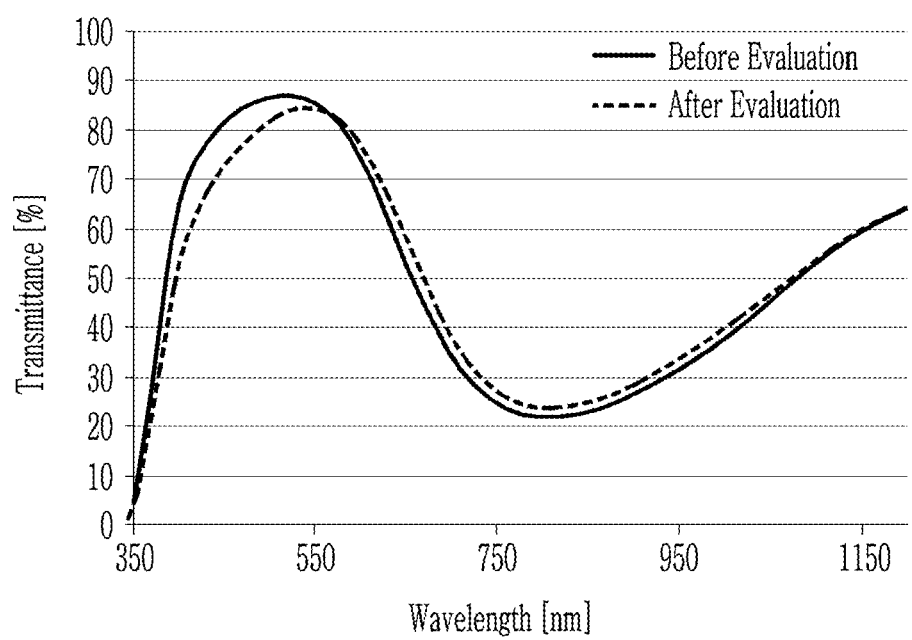
FIG. 13 is a graph showing an absorbance versus a wavelength of the optical structure according to Example 1 before and after the evaluation of high temperature/high humidity.
Figure 14:
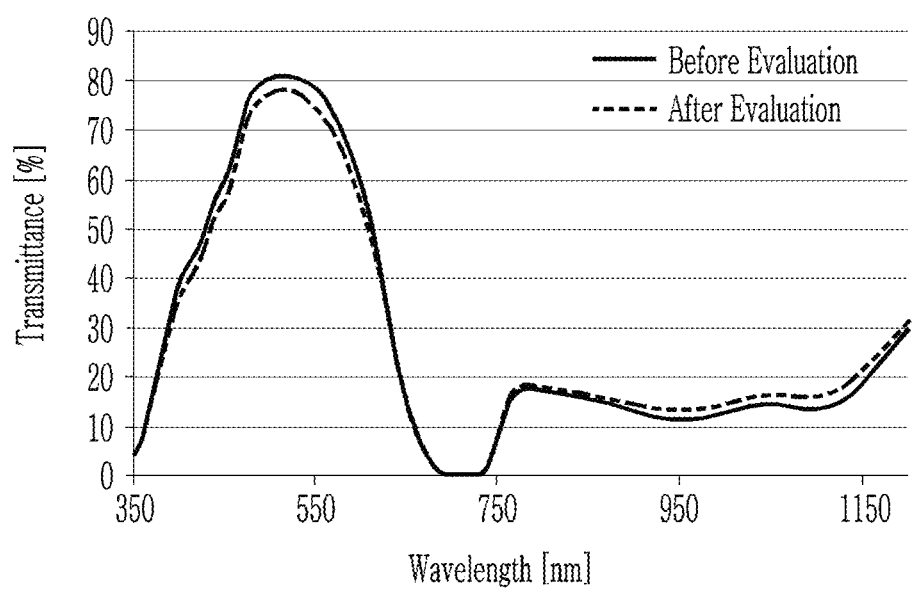
FIG. 14 is a graph showing an absorbance versus a wavelength of the optical structure according to Example 2 before and after the evaluation of high temperature/high humidity.
Figure 15:
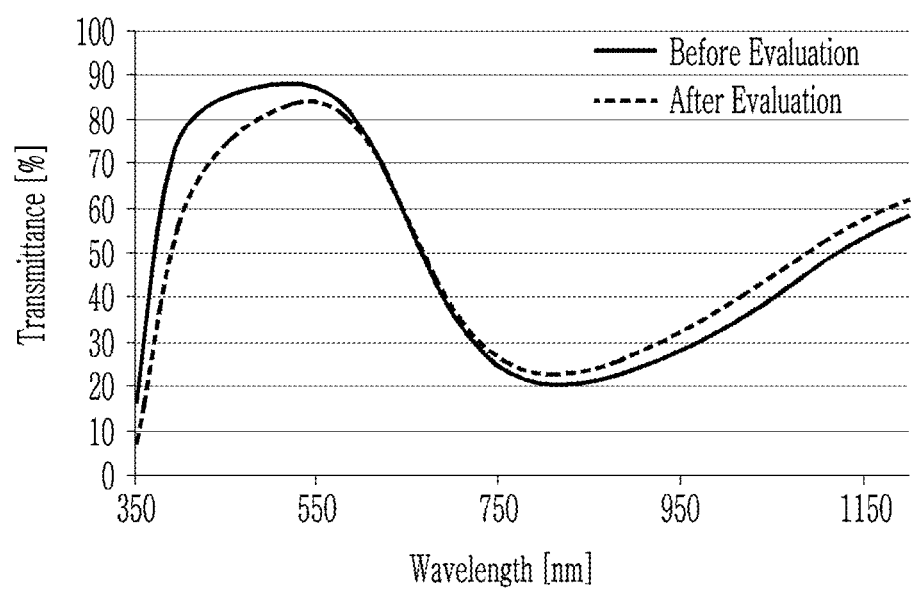
FIG. 15 is a graph showing an absorbance versus a wavelength of the optical structure according to Comparative Example 1 before and after the evaluation of high temperature/high humidity.
Figure 16:
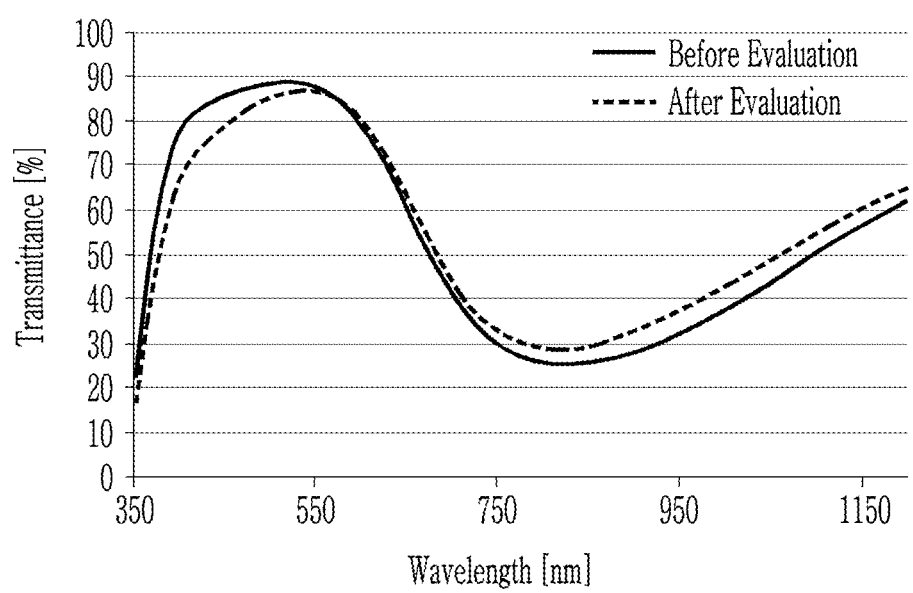
FIG. 16 is a graph showing an absorbance versus a wavelength of the optical structure according to Comparative Example 2 before and after the evaluation of high temperature/high humidity.

FIG. 12 is a schematic diagram of an electronic device 1300 according to some example embodiments.

As shown in FIG. 12, an electronic device 150 may include a processor 1120, a memory 1130, image sensor device 1140, and display device 1150 that are electrically coupled together via a bus 1110. The image sensor device 1140 may include any of the sensors 23 of any of the example embodiments as described herein. The memory 1130, which may be a non-transitory computer readable medium, may store a program of instructions. The processor 1120 may execute the stored program of instructions to perform one or more functions. The processor 1120 may further may execute the stored program of instructions to display the generated image on display device 1150. The processor 1120 may be configured to generate an output (e.g., an image to be displayed on the display device 1150).

Hereinafter, the embodiments are illustrated in more detail with reference to examples. However, these examples are example embodiments, and the present scope is not limited thereto.

Preparation of Copper Complex

Copper Complex 1

1.8 g of copper (II) acetate (Sigma-Aldrich Corp.) is dissolved in a tetrahydrofuran (Sigma-Aldrich Corp.) solvent, and 3.2 g of bis[2-(methacryloxy)ethyl] phosphate (Sigma-Aldrich Corp.} is added thereto and then, reacted therewith at room temperature for 1 day. In the reaction solution, non-reactants are filtered through a syringe filter to remove particles, a half of tetrahydrofuran with a rotary evaporator is removed, and a copper compound after removing a half of the solvent is precipitated in hexane, and dried in a vacuum oven at room temperature to less than or equal to 50° C. for 12 hours to prepare a copper complex represented by Chemical Formula 3.

[Chemical Formula 3]

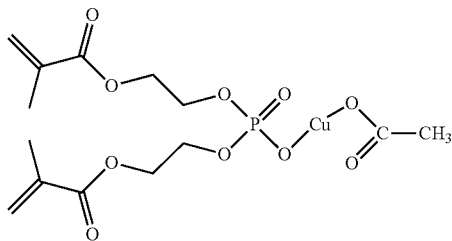

Copper Complex 2

1.8 g of copper (II) acetate (Sigma-Aldrich Corp.) is dissolved in a tetrahydrofuran solvent, and 2.1 g of ethylene glycol methacrylate phosphate (Sigma-Aldrich Corp.) is added thereto and then, reacted therewith at room temperature for 1 day. In the reaction solution, non-reactants are filtered through a syringe filter to remove particles, a half of tetrahydrofuran is removed with a rotary evaporator, and a copper compound after removing a half of the solvent is precipitated in hexane and dried in a vacuum oven at room temperature to less than or equal to 50° C. for 12 hours to prepare a copper complex represented by Chemical Formula 4.

[Chemical Formula 4-1]

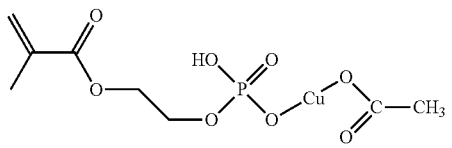

Copper Complex 3

1.8 g of copper (II) acetate (Sigma-Aldrich Corp.) is dissolved in a tetrahydrofuran solvent, and 4.2 g of ethylene glycol methacrylate phosphate (Sigma-Aldrich Corp.) is added thereto and then, reacted therewith at room temperature for 1 day. In the reaction solution, non-reactants are filtered through a syringe filter to remove particles, a half of tetrahydrofuran is removed with a rotary evaporator, and a copper compound after removing a half of the solvent is precipitated in hexane and dried in a vacuum oven at room temperature to less than or equal to 50° C. for 12 hours to prepare a copper complex represented by Chemical Formula 4-2.

[Chemical Formula 4-2]

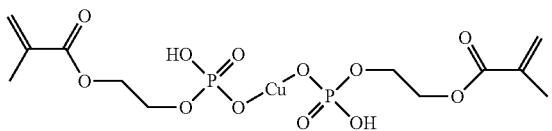

Preparation of Optical Structure Coating Composition

One gram of each aforementioned copper complex 1 to 3 is dissolved in 1 g of tetrahydrofuran (Sigma-Aldrich Corp.) and then, mixed with 0.5 g of trimethylolpropane triacrylate (TMPTA, Sigma-Aldrich Corp.), 0.125 g of an epoxy binder (EHPE-3150, Daicel Corp.), 0.094 g of N,N-(dimethylaminoethyl)methacrylate (Sigma-Aldrich Corp.), 0.12 g of diisopropylethylamine (DIPEA, Sigma-Aldrich Corp.), and 0.02 g of a photoinitiator (Irgacure® 184, BASF Corp.) to respectively prepare a near-infrared absorbing composition 1 (the copper complex 1), a near-infrared absorbing composition 2 (the copper complex 2), and a near-infrared absorbing composition 3 (the copper complex 3).

MANUFACTURE OF OPTICAL STRUCTURE

EXAMPLE 1

The near-infrared absorbing composition is coated with a bar #75 on an about 100 μm-thick cycloolefin polymer (COP, Zeon Co., Ltd.) film and photo-cured with a UV light dose of about 1000 mJ to form a first near-infrared absorption layer.

Subsequently, on the first near-infrared absorption layer, an acryl-based urethane primer (ERS-698, DIC Co., Ltd.) is coated with a bar #8 and photocured with a UV light dose of about 500 mJ, and then, a solution obtained by dissolving 1 g of polycarbonate (Lupoy, LG Chem Ltd.) in 4.5 g of chloroform is coated with a bar #10 thereon and dried in a 60° C. drying oven for 10 minutes to sequentially form a primer layer and an overcoating layer on the first near-infrared absorption layer (the copper complex 1) and thus manufacture a optical structure.

EXAMPLE 2

An acryl-based urethane primer (ERS-698, DIC Co., Ltd.) is bar-coated on the first near-infrared absorption layer and photocured with a UV light dose of about 300 mJ, and then, a solution obtained by dissolving 1 g of polycarbonate (Lupoy, LG Chem Ltd.), 0.015 g of a squarylium dye, and 0.01 g of a dimmonium dye (Epolight™ 1178, Epolin Inc.) in 4.5 g of chloroform is bar-coated and dried in a 60° C. drying oven for 10 minutes to sequentially from an about 100 μm-thick first near-infrared absorption layer (the copper complex 1), a primer layer, and an about 3 μm-thick second near-infrared absorption layer (an organic dye) and thus manufacture a optical structure.

COMPARATIVE EXAMPLE 1

An optical structure is manufactured according to the same method as Example 1 except that the copper complex 2 is used instead of the copper complex 1 to sequentially form an about 100 μm-thick first near-infrared absorption layer (the copper complex 2), a primer layer, and an overcoating layer on a cycloolefin polymer (COP, Zeon Co., Ltd.) film.

COMPARATIVE EXAMPLE 2

An optical structure is manufactured according to the same method as Example 1 except that the copper complex 3 is used instead of the copper complex 1 to sequentially form an about 100 μm-thick first near-infrared absorption layer (the copper complex 3), a primer layer, and an overcoating layer on a cycloolefin polymer (COP, Zeon Co., Ltd.) film.

Evaluation: Moisture Absorption Resistivity of Optical Structures of Examples 1 to 2 and Comparative Examples 1 to 2

Each wavelength vs. light transmittance graph of the optical structures according to Examples 1 to 2 and Comparative Examples 1 to 2 is obtained by using a UV-Vis spectrophotometer (SoldiSpec-3700, Shimadzu Scientific Instruments).

Subsequently, the optical structures according to Examples 1 to 2 and Comparative Examples 1 to 2 are put in a high temperature moisture absorption chamber (ARS-0220-AE, ESPEC Corp.) and allowed to stand at 80° C. under relative humidity of 85 RH % for 120 hours. Then, the UV-Vis spectrophotometer (SoldiSpec-3700, Shimadzu Scientific Instruments) as a high temperature/high humidity evaluation result is used to obtain each wavelength vs. light transmittance graph of the optical structures of Example 1 and Comparative Example 1 exposed to a high temperature/high humidity environment.

The obtained graphs are respectively shown in FIG. 7 (Example 1), FIG. 8 (Example 2), FIG. 9 (Comparative Example 1), and FIG. 10 (Comparative Example 2), and FIGS. 7 to 10 also show graphs before and after the high temperature/high humidity evaluation of each Example or Comparative Example.

On the other hand, an average light transmittance depending on each wavelength region and an average light transmittance change (Δ) before/after the high temperature/high humidity evaluation depending on each near-infrared wavelength region, which may be respectively obtained from the graphs of FIGS. 7 to 10, are summarized and shown in Table 1.

In an embodiment, the "average light transmittance change (Δ) before/after the high temperature/high humidity evaluation" denotes an absolute value of an average light transmittance difference of an optical structure before and after the high temperature (80° C.)/high humidity (85 RH %) environmental evaluation in an average light transmittance of the optical structure.

TABLE 1

| | | Average light transmittance [%] | | | |
| --- | --- | --- | --- | --- | --- |
| | | 700 nm–850 nm | 850 nm–950 nm | 950 nm–1100 nm | 1100 nm–1200 nm |
| Example 1 | before the evaluation of high temperature/high humidity | 24.7 | 26.7 | 41.7 | 59.2 |
| | after the evaluation of high temperature/high humidity | 27.0 | 28.8 | 43.3 | 59.4 |
| | Δ | 2.3 | 2.1 | 1.6 | 0.2 |
| Example 2 | before the evaluation of high temperature/high humidity | 11.5 | 13.5 | 13.6 | 20.2 |
| | after the evaluation of high temperature/high humidity | 12.1 | 14.9 | 15.5 | 22.5 |
| | Δ | 0.6 | 1.4 | 1.9 | 2.4 |
| Comparative Example 1 | before the evaluation of high temperature/high humidity | 24.1 | 24.1 | 36.9 | 53.4 |
| | after the evaluation of high temperature/high humidity | 26.2 | 27.6 | 41.5 | 57.3 |
| | Δ | 2.1 | 3.5 | 4.6 | 3.9 |
| Comparative Example 2 | before the evaluation of high temperature/high humidity | 29.3 | 28.7 | 41.2 | 56.8 |
| | after the evaluation of high temperature/high humidity | 32.5 | 33.1 | 46.0 | 60.4 |
| | Δ | 3.2 | 4.4 | 4.8 | 3.6 |

FIG. 7 is a graph showing an absorbance versus a wavelength of the optical structure according to Example 1 before and after the high temperature/high humidity evaluation, and FIG. 8 is a graph showing an absorbance versus a wavelength of the optical structure according to Example 2 before and after the high temperature/high humidity evaluation.

FIG. 9 is a graph showing an absorbance versus a wavelength of the optical structure according to Comparative Example 1 before and after the high temperature/high humidity evaluation, and FIG. 10 is a graph showing an absorbance versus a wavelength of the optical structure according to Comparative Example 2 before and after the high temperature/high humidity evaluation.

Referring to FIGS. 13 to 16 and Table 1, first, the optical structures according to Examples show a small average light transmittance difference of at least less than or equal to 3%, approximately, within about 2.5% before/after the high temperature/high humidity evaluation over a wavelength region of 700 nm to 1200 nm, but the optical structures of Comparative Examples show an average light transmittance difference of greater than at least 3% and up to about 4.8%.

Comparing Example 1 with Comparative Examples 1 to 2 which have the same stacking structure but use a different copper complex, Comparative Example 2 having two inorganic acid ester ligands shows the most deteriorated moisture absorption resistivity, and Comparative Example 1 having a heterogeneous ligand and including a hydroxyl group at the terminal end shows deteriorated moisture absorption resistivity, which is not much different from that of Comparative Example 2.

On the other hand, comparing Example 1 with Example 2 which have a different stacking structure, Example 2 shows a decreased average light transmittance (i.e., an increased average light absorbance) in each near-infrared wavelength region due to the second near-infrared absorption layer including an organic dye.

Accordingly, referring to the results of FIGS. 13 to 16 and Table 1, the optical structures of Examples including a copper complex having a heterogeneous ligand not including a hydroxyl group may have improved moisture absorption resistivity compared with a case not including the copper complex.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A near-infrared absorbing composition, comprising a copper complex represented by Chemical Formula 1:

[Chemical Formula 1]

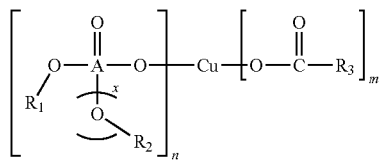

where,

A is one of phosphorus and sulfur, $R_1$ and $R_2$ are each independently one of a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, a substituted or unsubstituted C3 to C20 heteroaryl group, and a cross-linking functional group, $R_3$ is one of a substituted or unsubstituted C1 to C20 alkyl group, a substituted or unsubstituted C2 to C20 alkenyl group, a substituted or unsubstituted C2 to C20 alkynyl group, a substituted or unsubstituted C6 to C20 aryl group, and a substituted or unsubstituted C3 to C20 heteroaryl group, provided that each of $R_1$, $R_2$, and $R_3$ does not include a hydroxyl group (—OH), x is 0 or 1, $1 \leq m \leq 4$, and $1 \leq n \leq 4$.

2. The near-infrared absorbing composition of claim 1, wherein the cross-linking functional group is represented by Chemical Formula Z:

[Chemical Formula Z]

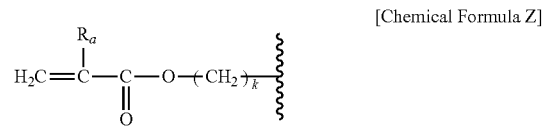

where, $R_a$ is one of hydrogen, a substituted or unsubstituted C1 to C20 alkyl group, a substituted or unsubstituted C1 to C20 heteroalkyl group, a substituted or unsubstituted C6 to C20 aryl group, and a substituted or unsubstituted C3 to C20 heteroaryl group, and k is an integer ranging from 0 to 8.

3. The near-infrared absorbing composition of claim 2, wherein at least one of $R_1$ and $R_2$ is the cross-linking functional group.

4. The near-infrared absorbing composition of claim 2, wherein A is phosphorus and both of $R_1$ and $R_2$ are the cross-linking functional group.

5. The near-infrared absorbing composition of claim 2, wherein the copper complex is represented by Chemical Formula 2:

[Chemical Formula 2]

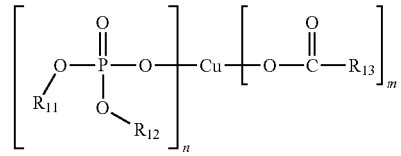

where $R_{11}$ and $R_{12}$ are independently one of a substituted or unsubstituted C1 to C20 alkyl group, a substituted or unsubstituted C6 to C20 aryl group, a substituted or unsubstituted C3 to C20 heteroaryl group, and a cross-linking functional group represented by Chemical Formula Z, $R_{13}$ is one of a substituted or unsubstituted C1 to C20 alkyl group, a substituted or unsubstituted C6 to C20 aryl group, and a substituted or unsubstituted C3 to C20 heteroaryl group, provided that each of $R_{11}$, $R_{12}$, and $R_{13}$ does not include a hydroxyl group (—OH), $1 \leq m \leq 4$, and $1 \leq n \leq 4$.

6. The near-infrared absorbing composition of claim 5, wherein $R_{11}$ and $R_{12}$ are independently one of a substituted or unsubstituted C1 to C20 alkyl group, a substituted or unsubstituted C6 to C20 aryl group, a substituted or unsubstituted C3 to C20 heteroaryl group, and the cross-linking functional group represented by Chemical Formula Z, provided that at least one of $R_{11}$ and $R_{12}$ is the cross-linking functional group represented by Chemical Formula Z, and $R_{13}$ is one of a substituted or unsubstituted C1 to C20 alkyl group, a substituted or unsubstituted C6 to C20 aryl group, and a substituted or unsubstituted C3 to C20 heteroaryl group.

7. The near-infrared absorbing composition of claim 5, wherein the copper complex is represented by Chemical Formula 3:

[Chemical Formula 3]

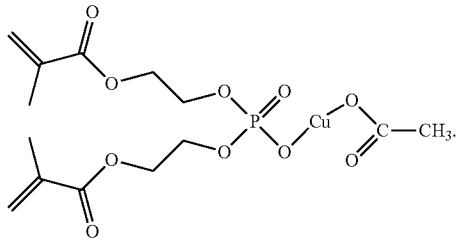

8. The near-infrared absorbing composition of claim 1, wherein the near-infrared absorbing composition further comprises a polymerizable monomer having a thermal polymerization property or a photo-polymerization property.

9. The near-infrared absorbing composition of claim 8, wherein the polymerizable monomer is an acryl-based monomer, an epoxy-based monomer, or a combination thereof.

10. An optical structure comprising a first near-infrared absorption layer formed using the near-infrared absorbing composition of claim 1.

11. The optical structure of claim 10, wherein the copper complex is included in an amount of about 50 wt % to about 100 wt % based on a total weight of the first near-infrared absorption layer.

12. The optical structure of claim 10, wherein the first near-infrared absorption layer further comprises an acryl-based polymer, an epoxy-based polymer, or a combination thereof.

13. The optical structure of claim 10, wherein the first near-infrared absorption layer has a maximum absorption wavelength in a wavelength region of about 700 nm to about 950 nm.

14. The optical structure of claim 10, wherein the first near-infrared absorption layer has an average light transmittance of less than or equal to about 30% in a wavelength region of about 700 nm to about 950 nm.

15. The optical structure of claim 10, wherein the optical structure further comprises a second near-infrared absorption layer comprising an organic dye which is distinct from the first near-infrared absorption layer.

16. The optical structure of claim 15, wherein the organic dye comprises a polymethine compound, a phthalocyanine compound, a merocyanine compound, a naphthalocyanine compound, an immonium compound, a diimmonium compound, a triarylmethane compound, a dipyrromethene compound, an anthraquinone compound, a naphthoquinone compound, a diquinone compound, a rylene compound, a perylene compound, a squaraine compound, a squarylium compound, a pyrylium compound, a thiopyrylium compound, a diketopyrrolopyrrole compound, a dithiolene metal complex compound, a derivative thereof, or a combination thereof.

17. The optical structure of claim 15, wherein the optical structure has an average light transmittance of less than or equal to about 20% in a wavelength region of about 700 nm to about 1100 nm.

18. The optical structure of claim 10, wherein the optical structure after being placed at a temperature of 80° C. under relative humidity of 85 RH % for 120 hours exhibits a change of an average light transmittance of less than or equal to about 3% in a wavelength region of about 700 nm to about 1200 nm.

19. A camera module comprising
a lens;
an image sensor; and
the optical structure of claim 10 disposed between the lens and the image sensor.

20. An electronic device comprising the optical structure of claim 10.

* * * * *